Jan. 7, 1958     H. E. BERNO     2,818,941
MOTOR VEHICLE BRAKE CONSTRUCTION

Filed March 18, 1955     2 Sheets—Sheet 1

H. E. BERNO.
INVENTOR.

BY E. C. McRae.
J. R. Faulkner.
T. H. Oster.

ATTYS.

Jan. 7, 1958  H. E. BERNO  2,818,941
MOTOR VEHICLE BRAKE CONSTRUCTION
Filed March 18, 1955  2 Sheets-Sheet 2
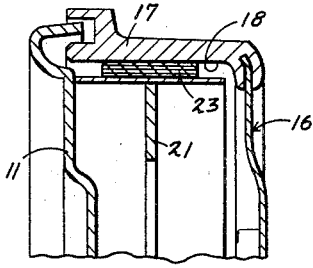
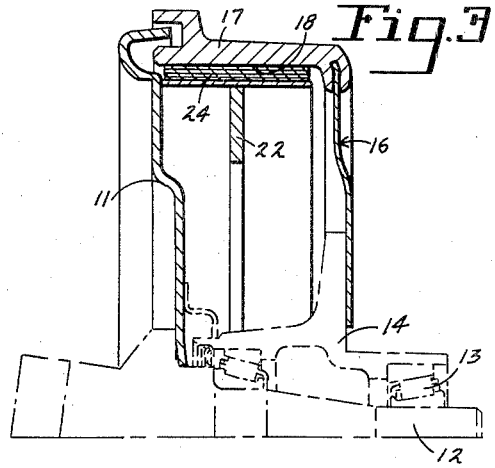
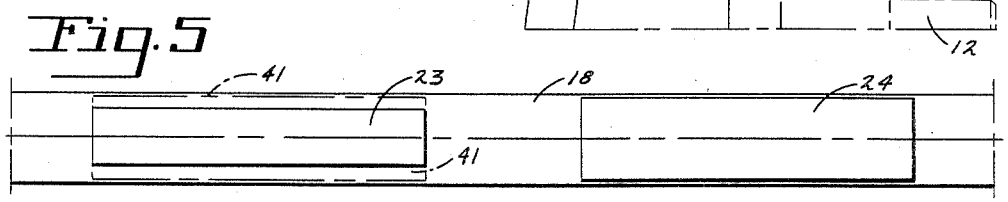
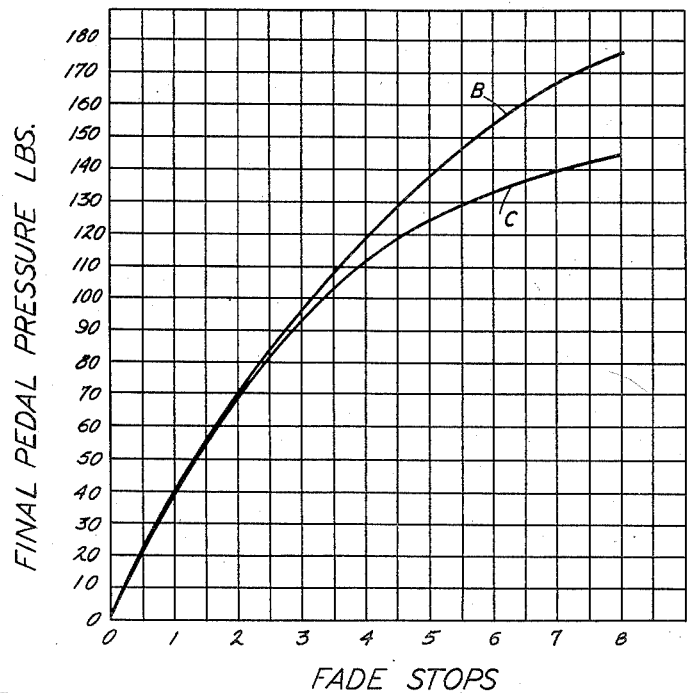
H. E. BERNO.
INVENTOR.
BY E. C. McRae.
J. R. Faulkner.
T. H. Oster.
ATTYS.

2,818,941

MOTOR VEHICLE BRAKE CONSTRUCTION

Harmond E. Berno, Plymouth, Mich., assignor to Ford Motor Company, Dearborn, Mich., a corporation of Delaware Application March 18, 1955, Serial No. 495,298

3 Claims. (Cl. 188—78)

This invention relates generally to brakes for motor vehicles, and particularly to brakes of the internal expanding shoe type.

An object of the present invention is to provide an internal expanding brake for motor vehicles in which the cooling of the brake drum is enhanced, to minimize the increase in pedal pressure after repeated severe brake stops and the likelihood of brake fading or failure. A further object is to provide an internal expanding brake of the servo or self energizing type in which substantially uniform unit pressures are obtainable on both the primary and secondary shoes, so that equalized wear and uniform brake action may be obtained.

Other objects and advantages of this invention will be made more apparent as this description proceeds, particularly when considered in connection with the accompanying drawings, wherein:

Figure 3 is a cross sectional view taken on the line 3—3 of Figure 1, through the secondary brake shoe and lining.

Figure 4 is a cross sectional view similar to a portion of Figure 3, but taken on the line 4—4 of Figure 1 through the primary brake shoe and lining.

Figure 5 is a diagrammatic developed view of the brake drum surface and the primary and secondary brake linings.

Figure 6 is a graph of fade tests.

Figure 2:
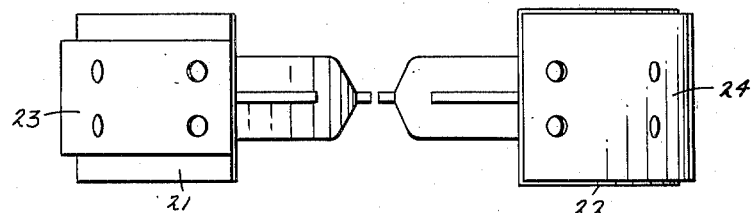
Figure 2 is a top plan view of the primary and secondary brake shoes and linings shown in Figure 1.

Referring now to the drawings, and particularly to Figures 1 to 4 inclusive, the reference character 11 indicates a brake backing plate mounted upon a wheel spindle 12. Rotatably mounted upon the spindle 12 by means of bearings 13 is a hub 14 supporting a brake drum 16 having a cast peripheral flange 17 formed with an internal drum surface 18.

Mounted upon the brake backing plate 11 are primary and secondary brake shoes 21 and 22 to which are riveted primary and secondary brake linings 23 and 24 respectively. Each brake lining extends circumferentially approximately 120° and is arranged to frictionally engage the internal surface 18 of the brake drum flange 17.

At their upper ends the primary and secondary brake shoes 21 and 22 are arranged to engage an anchor pin 26. An adjustable connector 27 connects the lower ends of the brake shoes. A hydraulic wheel cylinder 28 is mounted upon the brake backing plate 11 and contains a pair of pistons (not shown) effective through pins 29 to expand the brake shoes and linings into frictional engagement with the brake drum. Conventional retracting springs 31 and 32, steady rests 33, and an adjusting cam 34 are provided.

Figure 1:
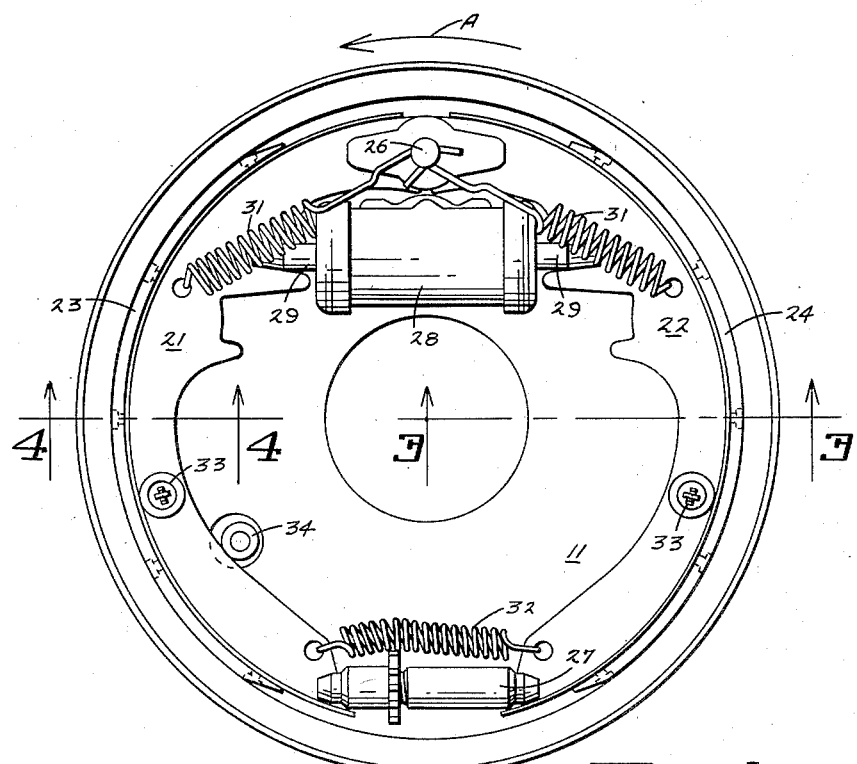
Figure 1 is an elevational view of a motor vehicle wheel brake constructed in accordance with the present invention.

The arrow A in Figure 1 indicates the direction of drum rotation during forward vehicle speeds. Since the brake is of the servo or self-energizing type the engagement of the primary brake lining 23 with the brake drum is effective, through the connector 27, to apply a self-energizing effect upon the secondary brake shoe 22 to wrap the secondary shoe and its lining into frictional engagement with the brake drum with increased force. In the conventional brake, therefore, the unit pressures between the brake linings and the brake drum are considerably higher in connection with the secondary lining than with the primary, thus causing unequal wear between the linings and necessitating brake relining of the secondary shoe long before the primary shoe requires attention.

As best seen in Figures 2, 3 and 4, the primary lining 23 of the present invention is considerably narrower in width than the secondary lining 24. By properly proportioning the widths of the primary and secondary linings, substantially uniform unit pressures between each lining and the drum can be obtained. In addition, it will be seen that since the primary lining 23 contacts a considerably narrower portion of the brake drum, a greater portion of the brake drum is free from frictional engagement with the primary lining and consequently heats up less rapidly. At the same time, a greater portion of the internal surface 18 of the drum is exposed to air so that the drum as a whole may cool more rapidly.

Reference is now made to Figure 5, which shows diagrammatically a flat developed view of the internal surface 18 of the brake drum. The reference character 23 represents the portion of the brake drum surface engaged by the primary lining, and 24 the portion of the drum surface engaged by the secondary lining. It has been found that a primary brake lining having approximately two thirds the width of the secondary brake lining is effective. For example, the primary lining 23 may have a width of one and a half inches in combination with a secondary brake lining 24 having a width of two and a quarter inches. With the primary brake lining 23 centered with respect to the secondary brake lining 24, a rectangular area 41 of the brake drum, which would normally be in frictional engagement with a conventional full width primary lining, is free from engagement with the narrow primary lining 23 of the present construction. Since the circumferential extent of the secondary lining 24 is approximately 120°, or one third the circumference of the brake drum, the narrow zones 41 at each side of the primary brake lining are free from frictional engagement with brake lining material for 240° or two thirds of each revolution of the brake drum. Consequently, these zones cool much more rapidly than in the case of a conventional brake construction, and the complete brake drum is maintained at a lower temperature.

This increased cooling is effective to improve the operating characteristics of the brake, as illustrated in the graph of Figure 6. This graph charts fade tests of a conventional brake and the brake of the present invention. In this test a series of consecutive brake stops are made from a speed of 80 miles per hour at a deceleration of 15 feet per second per second. Such repeated stops subject the brake to severe heating, and do not allow sufficient time between stops for proper cooling. As a result, the frictional characteristics of the linings diminish with successive stops, and this can be measured by the final pedal pressure required to obtain the desired deceleration rate. It will be noted from Figure 6 that the pedal pressure for a conventional brake construction increases along the curve marked B as successive fade stops are made, while the pedal pressure for the brake construction shown in Figures 1 to 5 inclusive increases along curve C. It will be seen that the final pedal pressures are lower with the present brake, and that the differential increases as the number of consecutive fade stops increase.

The increased cooling obtained with the brake construction of the present invention also forms a protection against complete brake failure which might otherwise occur in the event a sufficient number of high speed brake stops were successively made to raise the temperature high enough to produce a deteriorating effect upon the brake lining.

It will be understood that the invention is not to be limited to the exact construction shown and described, but that various changes and modifications may be made without departing from the spirit and scope of the invention, as defined in the appended claims.

What is claimed is:

1. In a servo brake for a motor vehicle, a rotatable drum, a stationary mounting plate, primary and secondary brake shoes mounted upon said plate, actuating means for expanding said brake shoes toward said drum, means interconnecting said primary and secondary brake shoes to transfer self-energizing force from said primary brake shoe to said secondary brake shoe, and friction lining of different widths mounted upon said brake shoes for frictional engagement with said brake drum, said primary lining being substantially narrower than said secondary lining.

2. The structure defined by claim 1 which is further characterized in that said narrow primary lining and said wider secondary lining are centrally aligned with each other axially of said rotatable drum so that said narrow primary lining exposes a strip of the frictional surface of said drum at each side of said primary lining, which strips are alternately frictionally engaged by said secondary lining and exposed by said primary lining as said drum rotates to enhance the cooling of said brake.

3. In a servo brake for a motor vehicle, a rotatable drum, a stationary backing plate, primary and secondary brake shoes mounted upon said backing plate, a hydraulic wheel cylinder mounted upon said backing plate between adjacent ends of said primary and secondary shoes to expand said shoes toward said drum, a connector interconnecting the opposite ends of said primary and secondary brake shoes to transfer circumferential force from said primary shoe to said secondary shoe to increase the force on said secondary shoe above that derived from said hydraulic wheel cylinder actuation, and friction linings of different widths mounted upon said brake shoes for frictional engagement with said brake drum, said primary lining being considerably narrower than said secondary lining to so proportion the relative areas of said primary and secondary linings to obtain substantially uniform unit pressures between said primary and secondary linings and said drum during the self-energizing application of said brake.

References Cited in the file of this patent

UNITED STATES PATENTS 2,105,046    La Brie _____ Jan. 11, 1938